US010717091B2

(12) United States Patent
Dehn et al.

(10) Patent No.: US 10,717,091 B2
(45) Date of Patent: Jul. 21, 2020

(54) BATCH CENTRIFUGE FILTER SCREEN

(71) Applicant: Aqseptence Group, Inc., New Brighton, MN (US)

(72) Inventors: Steven Dehn, Minneapolis, MN (US); Charles Flansburg, Andover, MN (US)

(73) Assignee: Aqseptence Group, Inc., New Brighton, MN (US)

( * ) Notice: Subject to any disclaimer, the term of this patent is extended or adjusted under 35 U.S.C. 154(b) by 251 days.

(21) Appl. No.: 15/502,594

(22) PCT Filed: Aug. 14, 2015

(86) PCT No.: PCT/US2015/045324
§ 371 (c)(1),
(2) Date: Feb. 8, 2017

(87) PCT Pub. No.: WO2016/025862
PCT Pub. Date: Feb. 18, 2016

(65) Prior Publication Data

US 2018/0207650 A1 Jul. 26, 2018

Related U.S. Application Data

(60) Provisional application No. 62/037,160, filed on Aug. 14, 2014.

(51) Int. Cl.
*B01D 33/00* (2006.01)
*B04B 7/16* (2006.01)
(Continued)

(52) U.S. Cl.
CPC .................. *B04B 7/16* (2013.01); *B04B 7/18* (2013.01); *B04B 11/04* (2013.01); *C13K 13/007* (2013.01)

(58) Field of Classification Search
USPC ........................................................ 210/380.1
See application file for complete search history.

(56) References Cited

U.S. PATENT DOCUMENTS

| | | | | |
|---|---|---|---|---|
| 6,761,821 B2 * | 7/2004 | Appel | B04B 3/00 127/19 | |
| 2015/0076051 A1 * | 3/2015 | Provo | E21B 43/084 210/232 | |
| 2015/0231537 A1 * | 8/2015 | Dietschreit | B04B 7/18 210/236 | |

FOREIGN PATENT DOCUMENTS

| | | |
|---|---|---|
| CN | 2780339 Y | 5/2006 |
| CN | 2868431 Y | 2/2007 |

(Continued)

OTHER PUBLICATIONS

WO2013190374A1 Naderi—Filter Screen for Centrifuge Basket (Abstract & MT; Dec. 27, 2013; 25 pages). (Year: 2013).*

(Continued)

*Primary Examiner* — Hayden Brewster
(74) *Attorney, Agent, or Firm* — Patterson Thuente Pedersen, P.A.

(57) ABSTRACT

A batch centrifuge having a filter screen that can be expeditiously removed and replaced and that is more rigid and more durable than filter screens that are typically employed in current practice. The batch centrifuge may include a centrifuge basket and a cylindrical filter screen disposed within the centrifuge basket, wherein the filter screen is formed of a plurality of curved panels that fit together at adjoining edges. In some embodiments, each of the curved panels may be small enough to fit through an opening in the top of the centrifuge basket without being bent or otherwise deformed.

10 Claims, 8 Drawing Sheets

(51) Int. Cl.

| | |
|---|---|
| ***B04B 7/18*** | (2006.01) |
| ***B04B 11/04*** | (2006.01) |
| ***C13K 13/00*** | (2006.01) |
| *B01D 35/00* | (2006.01) |

(56) References Cited

FOREIGN PATENT DOCUMENTS

| | | |
|---|---|---|
| JP | 7-275737 | 10/1995 |
| WO | WO 2008/116245 A1 | 10/2008 |
| WO | WO 2013/190374 A1 | 12/2013 |

OTHER PUBLICATIONS

JPH07275737A Matsumoto—Centrifugal Separator (Abstract & MT; Oct. 24, 1995; 39 pages). (Year: 1995).*

International Search Report for corresponding International Application No. PCT/US2015/045324 dated Dec. 3, 2015; 3 pages.

Written Opinion of the International Searching Authority for corresponding International Application No. PCT/US2015/045324 dated Dec. 3, 2015; 6 pages.

PCT International Preliminary Report on Patentability for International Application No. PCT/US2015/045324, dated Feb. 23, 2017, 8 pages.

Office Action with search report for corresponding CN patent application No. 201580056056.1, dated Aug. 17, 2018, 7 pages.

English translation of Office Action with search report for corresponding CN patent application No. 201580056056.1, dated Aug. 17, 2018, 7 pages.

* cited by examiner

BATCH CENTRIFUGE FILTER SCREEN

CROSS-REFERENCE TO PRIORITY RELATED APPLICATIONS

The present application is a National Phase entry of PCT Application No. PCT/US2015/045324, filed on Aug. 14, 2015, which claims priority to U.S. Provisional Patent Application No. 62/037,160, filed on Aug. 14, 2014, both of which are hereby fully incorporated herein by reference.

FIELD OF THE INVENTION

The disclosure relates generally to the field of sugar processing equipment and more particularly to a batch centrifuge used for separating sugar crystals from massecuite.

BACKGROUND

Batch centrifuges are commonly employed in sugar processing for separating sugar crystals from massecuite. During such separation, an amount of massecuite is placed in a centrifuge basket. The basket is then accelerated to a predetermined angular velocity which is maintained for a predetermined spin time. As the basket spins, liquid in the massecuite is forced through a cylindrical filter screen that covers an interior sidewall of the basket while sugar crystals are retained by the filter screen. The separated liquid is flushed through perforations in the centrifuge basket. After the spin is completed, a scraper arm is used to remove the sugar crystals from the filter screen. The sugar crystals are then collected through a hole in the bottom of the basket.

Filter screens of batch centrifuges typically experience a significant amount of wear during operation, such as may result from engagement with abrasive sugar crystals and from engagement with scraper arms. It is therefore necessary to replace the filter screens of batch centrifuges on a periodic basis. Since the interiors of batch centrifuges are generally only accessible through openings that are significantly smaller than a typical filter screen, filter screens are often constructed from very thin foils or meshes that allow the filter screen to be folded or collapsed upon itself and passed through a small opening in a centrifuge before being unfurled and installed within the centrifuge. However, because they are so thin, such foils and meshes lack durability and must be replaced more often than is desirable. In addition, due to the relatively fragile construction of such foils and meshes, heavy cylindrical mesh backings are typically between the filter screen and the centrifuge wall to provide thin filter screens with additional support. These mesh backings are typically in the form of thick, heavy chain-like structures. Such mesh backings, however, add weight and cost and the additional weight may impede the functioning if the centrifuge. Although use of filter screens formed of thicker, more durable foils and meshes may be advantageous, they have not been used in centrifuge applications because, due to their rigidity, they cannot be collapsed to fit through the opening in the top of the centrifuge. Their use requires the centrifuge to be disassembled to insert, remove or replace the filter screen. Furthermore, any blockage or damage caused during operation would require the entire foil to be replaced, adding cost and time consumption.

In view of the forgoing, it would be advantageous to provide a durable batch centrifuge filter screen that can be conveniently and expeditiously removed and replaced.

BRIEF SUMMARY

This Summary is provided to introduce a selection of concepts in a simplified form that are further described below in the Detailed Description. This Summary is not intended to identify key features or essential features of the claimed subject matter, nor is it intended as an aid in determining the scope of the claimed subject matter.

Various embodiments of the present disclosure are generally directed to a batch centrifuge having a filter screen that can be expeditiously removed and replaced and that is more rigid and more durable than the thin filter screens that are typically employed in current practice.

The batch centrifuge of the present disclosure may include a centrifuge basket and a cylindrical filter screen disposed within the centrifuge basket, wherein the filter screen is formed of a plurality of curved panels that fit together at adjoining edges. Each of the curved panels is small enough to fit through an opening in the top of the centrifuge basket without being bent or otherwise deformed.

Embodiments of the invention relate to a filter screen for a batch centrifuge comprising a plurality of filter panels, wherein each of the plurality of filter panels comprises a screen portion and a frame; wherein each of the plurality of filter panels further comprises one or coupling features disposed along lateral sides of each filter panel to enable the plurality of filter panels to be coupled together to form the filter screen.

In some embodiments, the lateral sides of each of the plurality of filter panels comprise a first lateral side and an opposing second lateral side, wherein the plurality of filter panels further comprise one or more first filter panels, at least one second filter panel and at least one third filter panel, wherein each of the one or more first filter panels comprise a first coupling feature disposed along the first lateral side and a second coupling feature disposed the second lateral side, wherein the first coupling feature and the second coupling feature of adjacent first filter panels are configured to be interlocked; wherein the at least one second filter panel comprises the first coupling feature disposed along the first lateral side and a third coupling feature disposed along the second lateral side, wherein the first coupling feature associated with the at least one second filter panel and the second coupling features associated with the one or more first filter panels are configured to be interlocked; wherein the at least one third filter panel comprises a fourth coupling feature disposed along the first lateral side and the second coupling feature disposed along the second lateral side, wherein the second coupling feature associated with the at least one third filter panel and the first coupling features associated with the one or more first filter panels are configured to be interlocked; and wherein the third coupling feature associated with the at least one second filter panel and the fourth coupling feature associated with the at least one third filter panel are complementary and are configured to be interlocked.

In some embodiments the first coupling feature comprises a groove, the second coupling feature comprises a tongue complementary to the groove, and the third and fourth coupling features comprise complementary shoulders.

In some embodiments the one or more coupling features of the filter screen are formed in the frame portion.

In some embodiments the one or more coupling features of at least two of the plurality of filter panels comprise complementary tongue and groove features for forming a tongue and groove joint when the at least two filter panels are coupled together along adjacent lateral sides.

In some embodiments the one or more coupling features of at least two of the plurality of filter panels comprise complementary shoulders for forming a lap joint when the at least two filter panels are coupled together along adjacent lateral sides.

In some embodiments the filter screen further comprises a fastener disposed through the complementary shoulders to fix the at least two filter panels together.

In some embodiments the one or more coupling features of at least two of the plurality of filter panels comprise complementary surfaces that enable the resulting joint to be indented inward, and then pushed outward until the at least two of the plurality of filter panels pop into place against a surface on the interior of a basket of the batch centrifuge.

In some embodiments the one or more coupling features of at least two of the plurality of filter panels comprise complementary hook and loop features for forming sliding, overlapping joints when the at least two filter panels are coupled together along adjacent lateral sides.

In some embodiments the filter screen further comprises one or more ring clamps configured to secure the plurality of filter panels inside a basket of the batch centrifuge by exerting radially-outwardly directed force on the plurality of filter panels.

In some embodiments the one or more coupling features form at least partially overlapping joints when at least two filter panels are coupled together along adjacent lateral sides, wherein the partially overlapping joints are configured to provide a tight seal for the filter screen.

In some embodiments each of the filter panels has a thickness in a range of ¼ inch to ½ inch.

In some embodiments the screen portion is sized and configured to separate sugar crystals from massecuite.

In some embodiments the screen portion comprises at least two screen layers, at least one of the screen layers comprising a plurality of wires, wherein the plurality of wires comprise a triangular cross-section.

Some embodiments of the invention relate to a batch centrifuge, wherein the batch centrifuge is a centrifuge for separating sugar crystals from massecuite, wherein the batch centrifuge comprises: at least one basket, wherein the basket comprises a first end and an opposite second end and a basket surface between the first end and the second end, wherein the first end and the second end define a centrifuge axis, wherein the first end comprises at least one opening, wherein the basket surface comprises a plurality of apertures; at least one shaft, wherein the at least one shaft is oriented along the centrifuge axis; and the plurality of filter panels as described above, wherein each of the plurality of filter panels are configured to be inserted through the at least one opening and assembled inside the at least one basket.

Some embodiments of the invention relate to methods for providing a filter screen for a batch centrifuge, wherein the methods comprise, in one form or another, providing, a plurality of filter panels comprising a screen portion and a frame, wherein each of the plurality of filter panels further comprises one or more coupling features disposed along opposing lateral sides of each filter panel to enable the plurality of filter panels to be coupled together to form the filter screen; inserting, each of the plurality of filter panels, successively, through an opening in a basket of the batch centrifuge into an interior of the basket of the batch centrifuge; and interlocking, successively, the one or more coupling features of the plurality of filter panels to thereby create the filter screen positioned in the interior of the basket of the batch centrifuge.

In some embodiments inserting further comprises inserting each of the plurality of filter panels through the opening in the basket of the batch without bending and/or deforming the plurality of filter panels.

In some embodiments the lateral sides of each of the plurality of filter panels comprise a first lateral side and an opposing second lateral side; the plurality of filter panels further comprises one or more first filter panels, at least one second filter panel and at least one third filter panel; each of the one or more first filter panels comprise a groove feature disposed along the first lateral side and a tongue feature disposed the second lateral side, wherein the tongue feature and the groove feature are complementary and the tongue feature and the groove feature of adjacent filter panels are configured to be interlocked; the at least one second filter panel comprises the groove feature disposed along the first lateral side and a first shoulder feature disposed along the second lateral side; the at least one third filter panel comprises a second shoulder feature disposed along the first lateral side and the tongue feature disposed along the second lateral side; and the first shoulder feature and the second shoulder feature are complementary and the first shoulder feature and the second shoulder feature of adjacent filter panels are configured to be interlocked.

In some embodiments interlocking further comprises inserting at least one mechanical fastener through a complementary shoulder joint formed by interlocking the first shoulder feature and the second shoulder feature of adjacent filter panels.

In some embodiments the interlocking further comprises coupling two or more filter panels of the plurality of filter panels together, along adjacent lateral sides, by indenting the associated one or more coupling features inward; and pushing edges of the two or more filter panels outward until the two or more filter panels pop into place against a surface in the interior of the basket of the batch centrifuge.

Some embodiments of the invention relate to separating sugar crystals from massecuite, wherein separating further comprises: placing an amount of massecuite containing sugar crystals in the basket of the batch centrifuge; accelerating the basket of the batch centrifuge to spin for a predetermined spin time; forcing the massecuite out of the interior of the basket of the batch centrifuge through the filter screen; and removing sugar crystals from the filter screen.

In some embodiments disconnecting the one or more coupling features associated with the plurality filter panels and withdrawing each of the plurality of filter panels, successively, through the opening in the basket of the batch centrifuge.

BRIEF DESCRIPTION OF THE DRAWINGS

Figure 1:
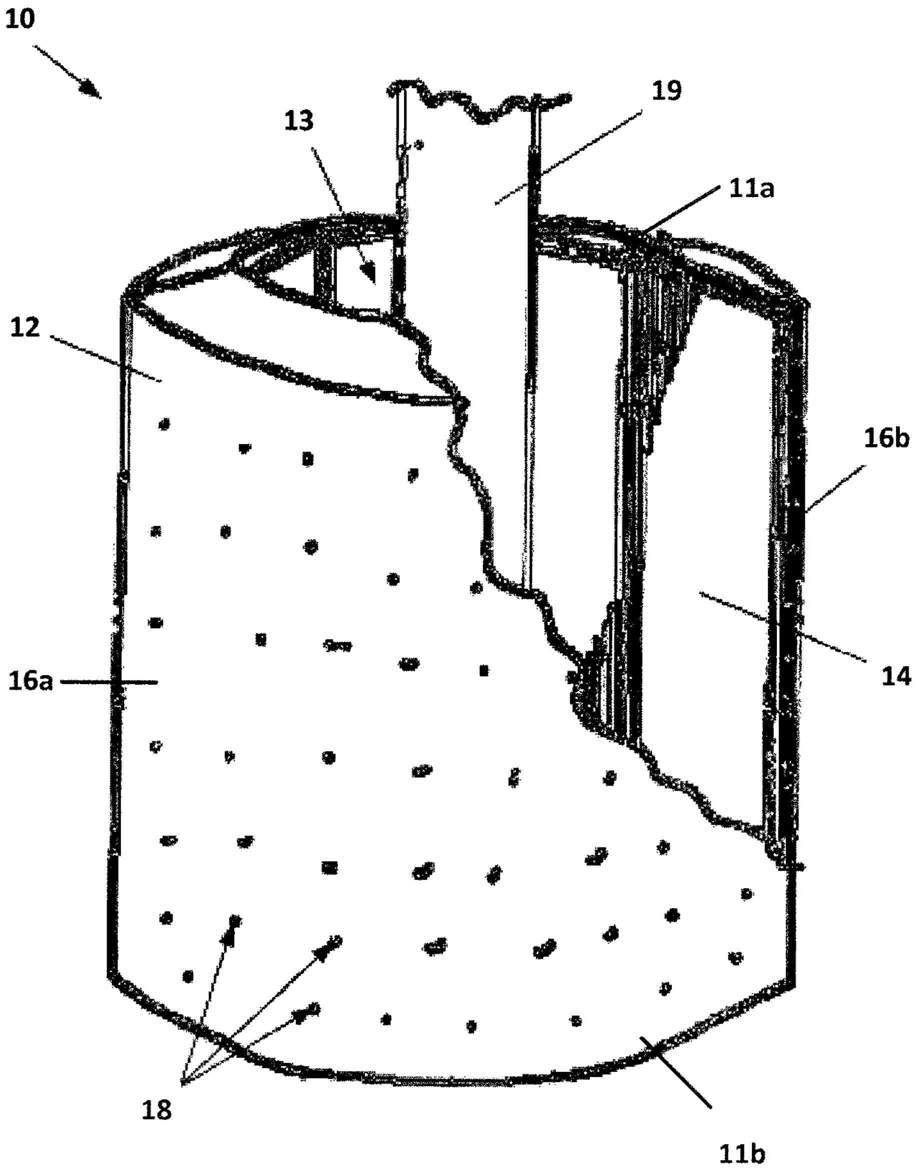

Having thus described embodiments of the invention in general terms, reference will now be made to the accompanying drawings, wherein:

FIG. 1 is an isometric cutaway view illustrating an exemplary batch centrifuge in accordance with an embodiment of the present disclosure.

Figure 2:
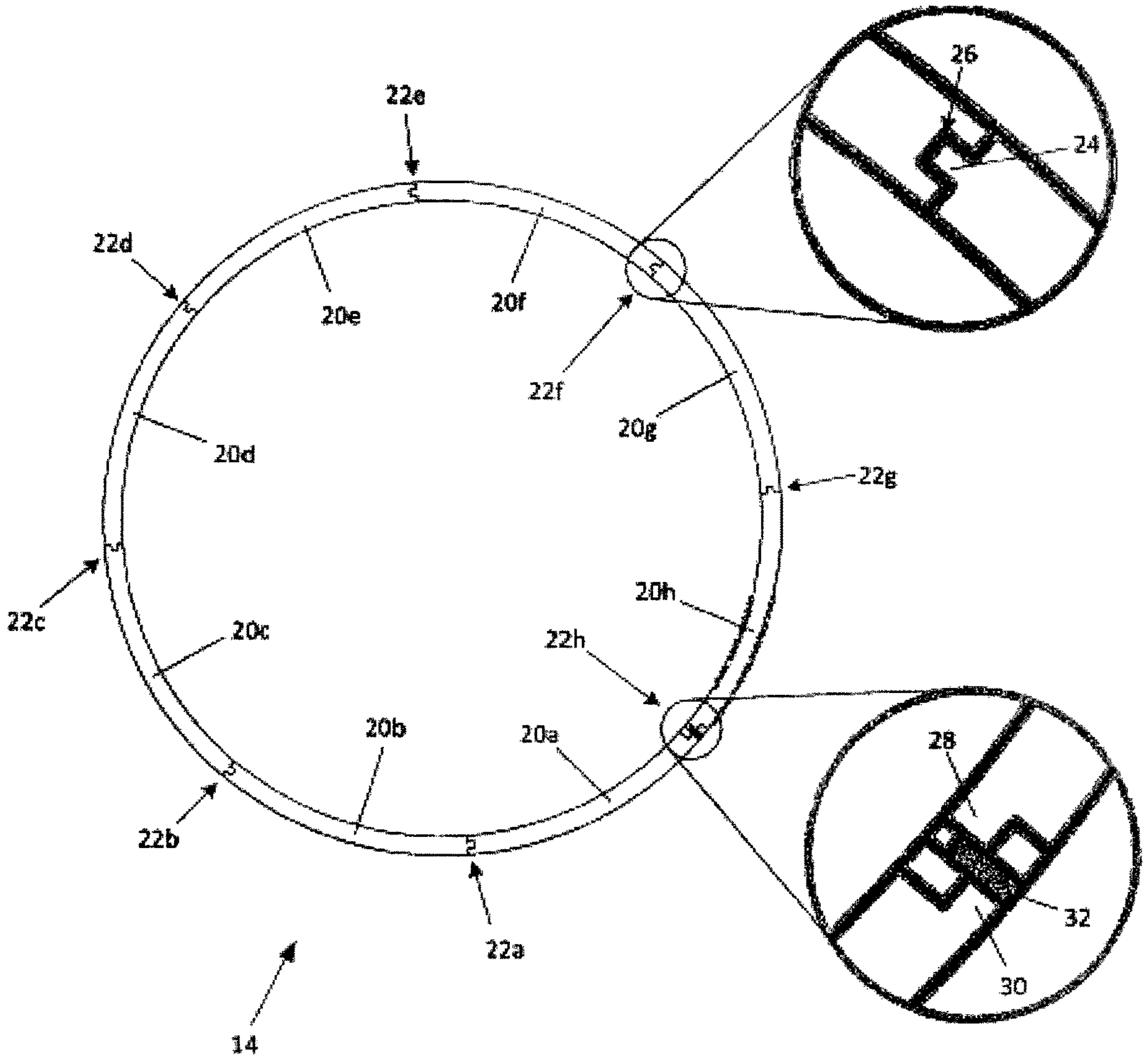

FIG. 2 is a top view illustrating the filter screen of the batch centrifuge shown in FIG. 1.

Figure 3:
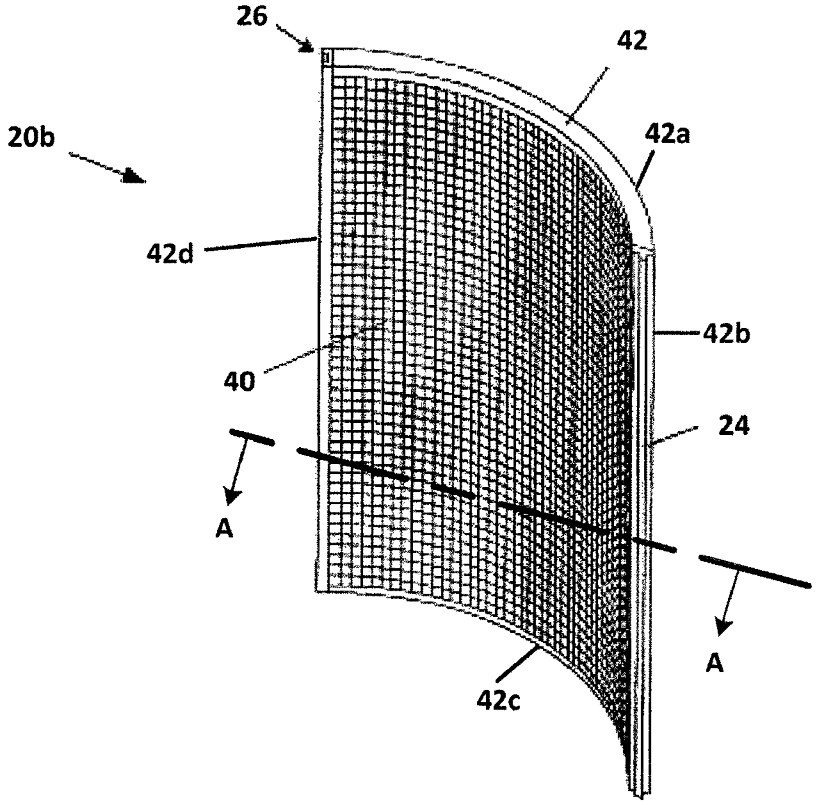

FIG. 3 is an isometric view illustrating a curved screen panel of the filter screen of the batch centrifuge shown in FIG. 1.

Figure 4A:
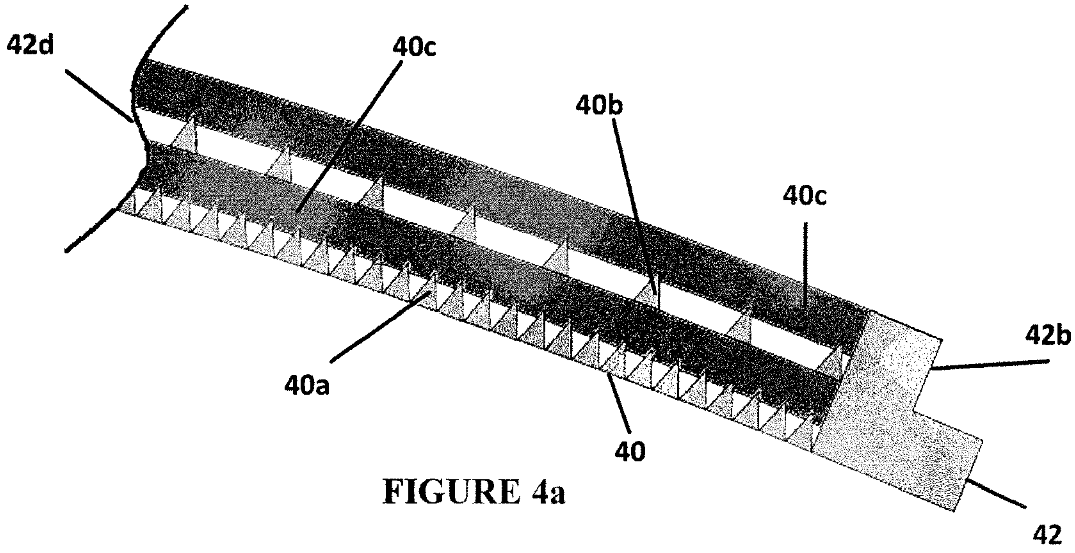
Figure 4B:
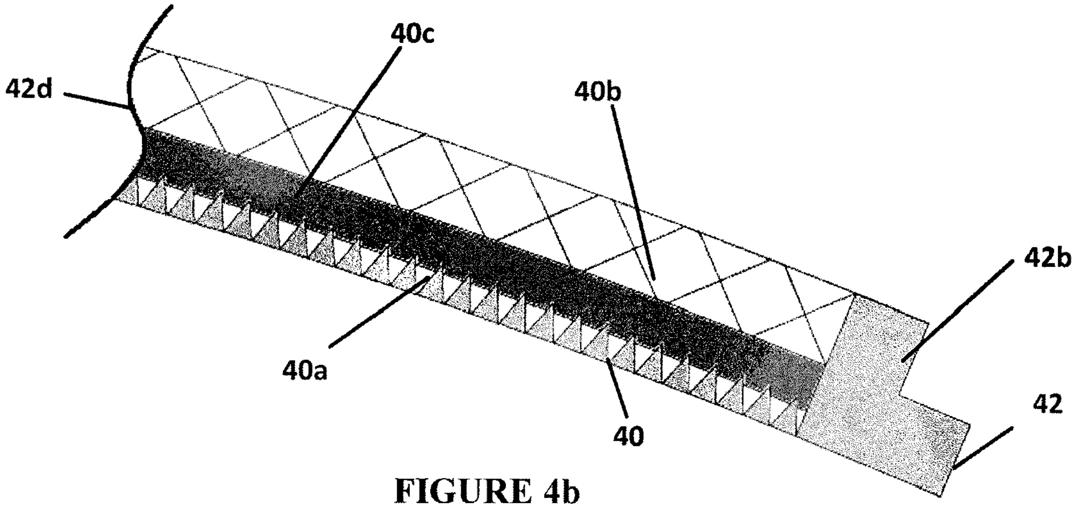

FIGS. 4*a* and 4*b* are cross-sectional views illustrating alternative embodiments of the screen portion of the filter screen shown in FIG. 3.

Figure 5:
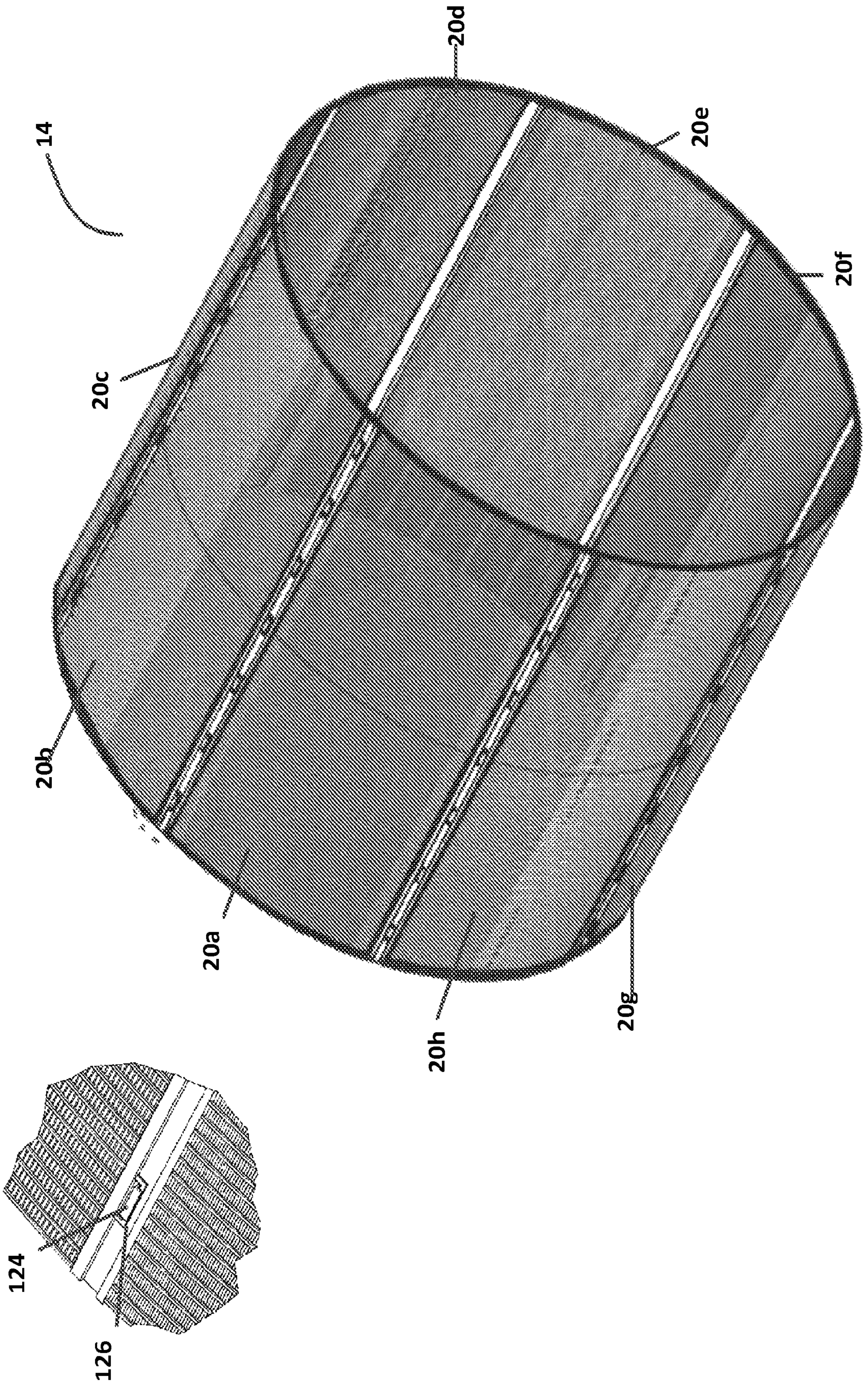

FIG. 5 is an isometric view illustrating an alternative embodiment of the filter screen of the batch centrifuge shown in FIG. 1.

Figure 6:
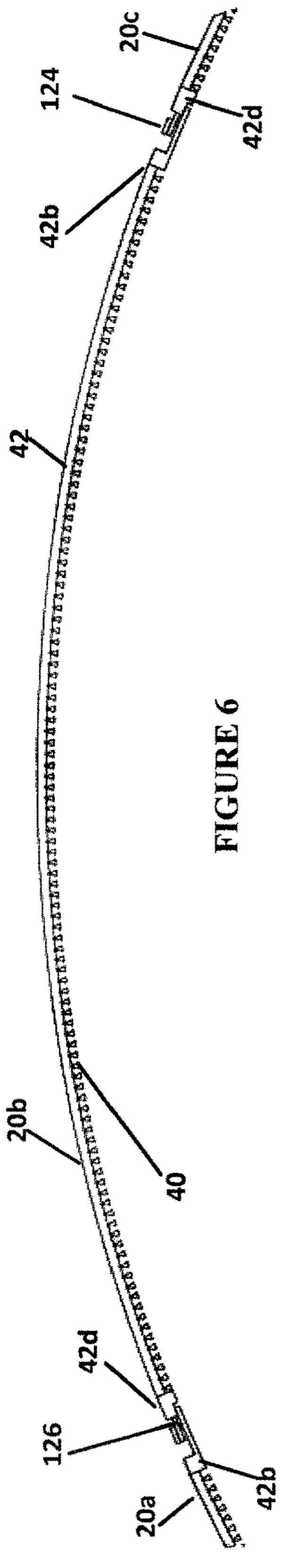

FIG. 6 is an end-on view illustrating engagement between three curved panels of the alternative filter screen shown in FIG. 5.

Figure 7C:
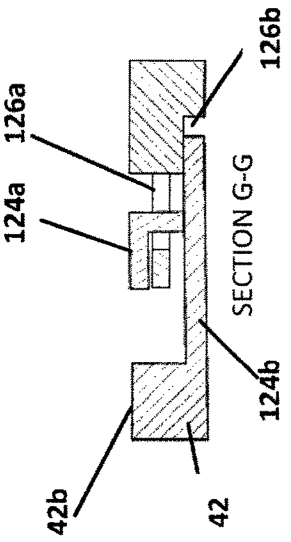
Figure 7D:
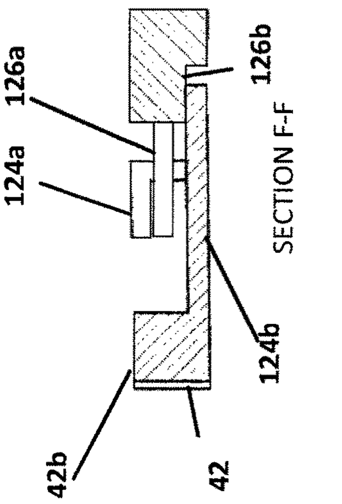
Figure 7B:
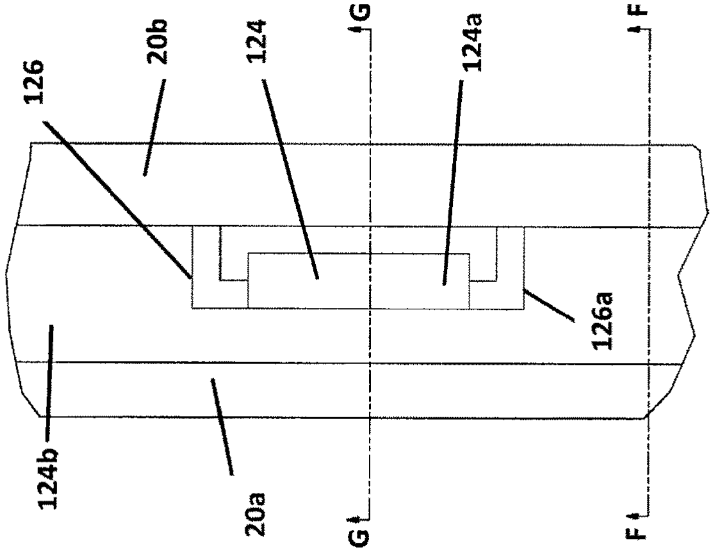
Figure 7A:
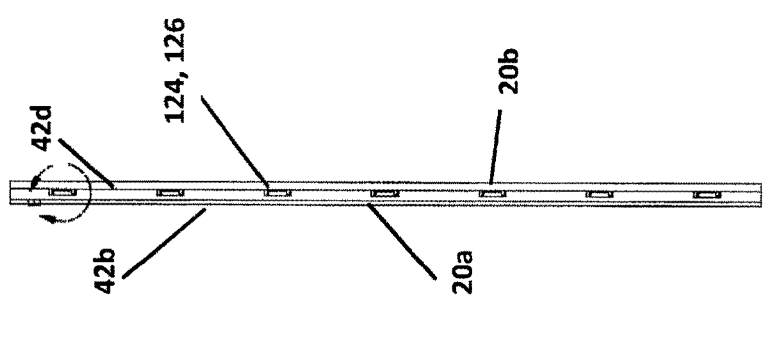

FIG. 7*a* is section of a front view illustrating engagement between two curved panels of the alternative filter screen shown in FIG. 5.

FIG. 7*b* is an enlarged front view illustrating engagement between two curved panels of the alternative filter screen shown in FIG. 5.

FIGS. 7*c* and 7*d* are cross-sectional views illustrating engagement between two curved panels of the alternative filter screen shown in FIG. 7*b*.

Figure 8B:
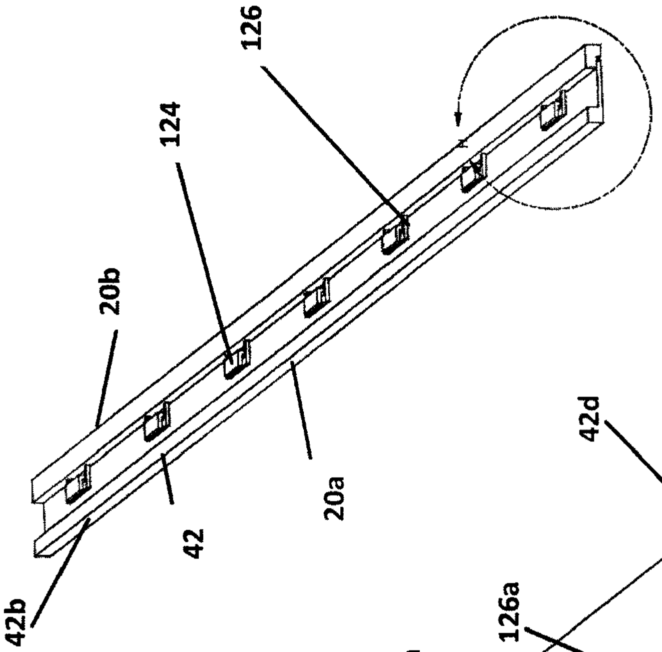
Figure 8A:
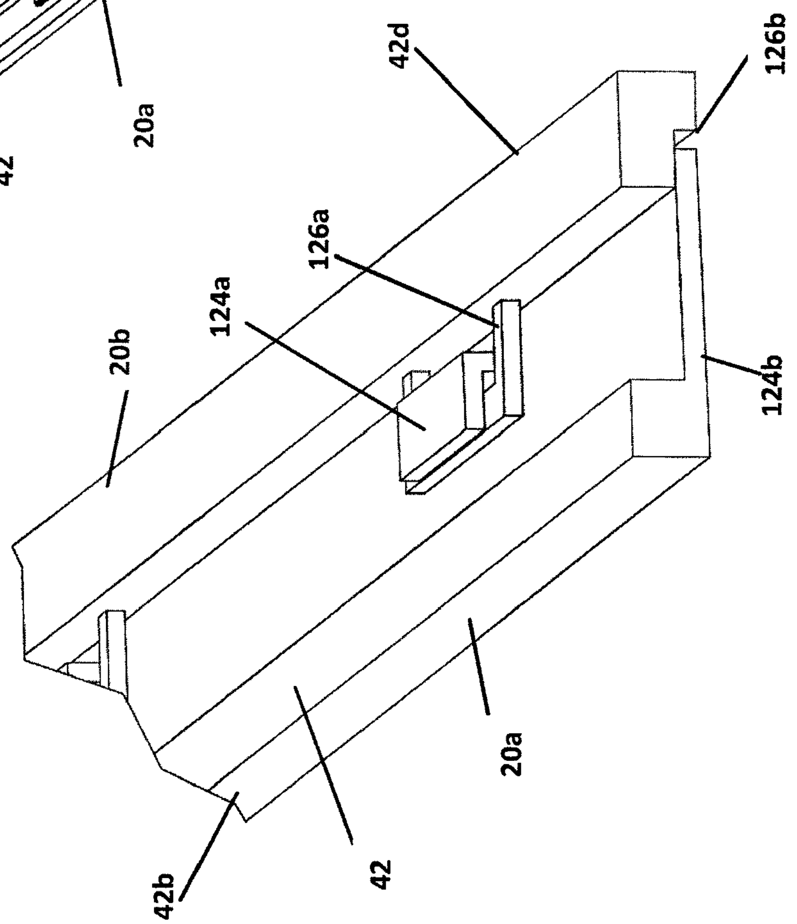

FIGS. 8*a* and 8*b* are isometric views illustrating engagement between two curved panels of the alternative filter screen shown in FIG. 7*b*.

Figure 9:
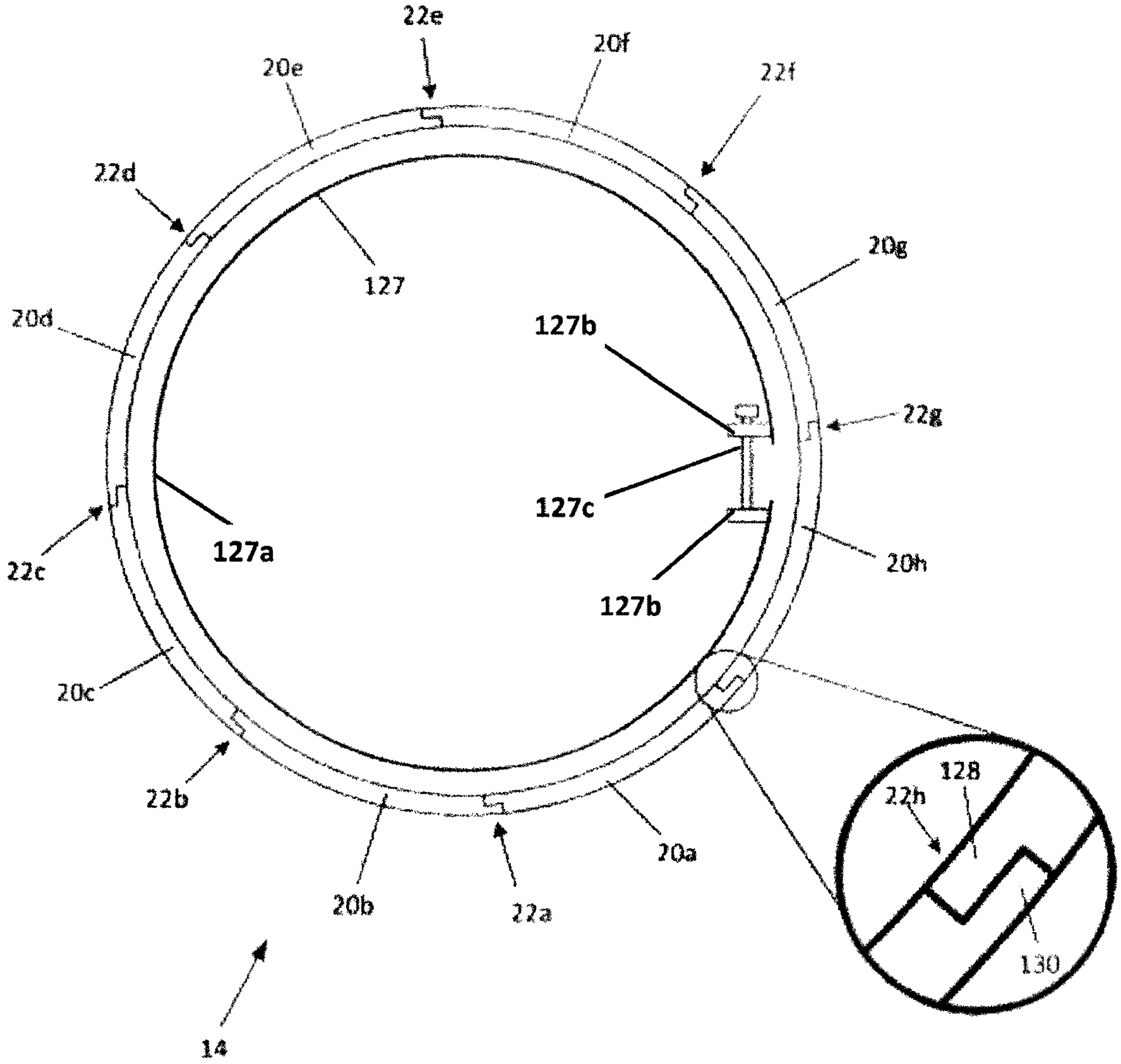

FIG. 9 is a top view illustrating another alternative filter screen of the batch centrifuge shown in FIG. 1.

DETAILED DESCRIPTION OF EMBODIMENTS OF THE INVENTION

The present invention will now be described more fully hereinafter with reference to the accompanying drawings, in which preferred embodiments of the invention are shown. The invention, however, may be embodied in many different forms and should not be construed as being limited to the embodiments set forth herein. Rather, these embodiments are provided so that this disclosure will be thorough and complete, and will fully convey the scope of the invention to those skilled in the art. In the drawings, like numbers refer to like elements throughout.

Referring now to FIG. 1, an isometric cut-away view illustrating an exemplary batch centrifuge 10 (hereinafter "the centrifuge 10") is shown. The centrifuge 10 comprises a first end 11*a*, an opposite second end 11*b* and a basket 12 in between arranged along a centrifuge axis. In some embodiments the basket 12 is substantially cylindrical with a circular cross section, while in other embodiments the basket may comprise one or more of suitable elliptical, polygonal or curvilinear cross-sections. The first end 11*a*, the second end 11*b* and the basket 12 may be a one-piece construction or may be separate components that are fastened suitably. The first end 11*a* of the centrifuge 10 may comprise at least one opening, for example the opening 13 illustrated in FIG. 1. In some embodiments the second end 11*b* also comprises one or more openings or apertures (not shown). In some embodiments, the basket 12 and/or the opening 13 are centered along the centrifuge axis. In some embodiments, the centers of the cross-sections of the basket 12 and the opening 13 are offset from the centrifuge axis. The basket 12 comprises an exterior surface 16*a* and an interior surface 16*b*. The basket 12 may further comprise a plurality of apertures or perforations 18 for allowing liquid to be drained out of the basket 12 during a sugar separation process in a manner that will be familiar to those of ordinary skill in the art. In some embodiments, a cylindrical filter screen 14 may be disposed within the basket 12 in a radially close clearance relationship with the interior surface 16*b* of the basket 12. In this regard, the filter screen 14 may radially abut, and be supported by, the interior surface 16*b*. This direct abutment is advantageous in some applications because it enables the sidewall to provide support to the filter screen 14 during operation of the centrifuge 10. However, in some embodiments, there are one or more support components (not shown) between the filter screen 14 and the interior surface 16*b* of the basket 12. The support components can comprise one or more bars, rods, backing, coarse meshes or screens and the like. The design and materials of the support components may be chosen such that components can withstand high torque and axial and tangential stresses and strains, without affecting their structural integrity, while having minimal weight.

A drive mechanism (not shown) may be operatively coupled to the basket 12 for rotatably driving the basket 12 about the centrifuge axis during operation. A shaft 19 may extend into the opening 13 and may have a scraper arm (not shown) attached to a lower end thereof for removing sugar crystals from the interior surface of the filter screen 14. In some embodiments, the shaft 19 is coincident with the centrifuge axis. The shaft 19 and the centrifuge axis may be vertical (as illustrated by FIG. 1), horizontal or oriented at any suitable angle.

As best shown in the top view of the filter screen 14, in the first embodiment of the invention, illustrated in FIG. 2, the filter screen 14 may be formed of a plurality of curved screen panels 20*a-h* that are joined together at their lateral sides to form the assembled cylindrical filter screen 14. In some embodiments each of the panels 20*a-h* may cover at least a portion of the basket 12 and may be shaped substantially similar to the curvature of the basket 12. In some embodiments at least one of the curved screen panels may comprise one or more sub-panels (not shown) arranged to form a filter screen with a grid like structure. In this regard, the sub-panels associated with one screen panel may be arranged in a parallel or a staggered manner with respect to the sub-panels of another screen panel. The optimal size and number of the curved screen panels 20 may be determined based on a number of factors comprising, the size, shape and volume of the basket 12, the dimensions of the opening 13, the rigidity of the materials that the screen panels are constructed out of and the like. For example a basket with the capacity of 30-40 pounds may require 8 panels. As another example, 8 panels, of larger dimensions or substantially rigid materials may be appropriate for insertion into a large opening 13, while 16 panels of smaller dimensions or suitably flexible materials may be suitable for a smaller opening 13. Although termed and illustrated as curved screen panels 20*a-h* forming a cylinder, for the purposes of example, and not limitation, other embodiments the screen panels 20*a-h* may be shaped like flat planes, Euclidean planes, sections of a cylinder, cone or any other three-dimensional geometry, Riemann surfaces or a combination of the above.

An isometric view of an exemplary curved screen panel 20*b* is illustrated in FIG. 3. It will therefore be understood that the following description of the curved screen panel 20*b* may generally apply to each of the plurality of curved screen panels 20*a*, 20*c-h* and/or the associated sub-panels. The curved screen panel 20*b* comprises a proximal side 42*a*, lateral sides (42*b*, 42*d*) and a distal side 42*c*. Although illustrated as comprising four sides, the curved screen panel 20*b* can comprise more or fewer sides and can be of any suitable shape. The curved panel further comprises a frame 42 forming at least a portion of the perimeter of a screen portion 40. In the exemplary embodiment, the frame 42 surrounds the screen portion 40 on all the sides and is of a substantially similar shape as that of the screen portion 40. The frame 42 of the curved screen panel 20*b* may be formed of solid metal bar elements that may be welded or otherwise rigidly affixed to the edges of the screen portion 40. The screen portion 40 further comprises an inner surface facing the interior of the basket 12 and an outer surface facing the interior surface 16*b* of the basket 12 when assembled. For reasons that will become apparent below, in some embodiments the individual curved screen panel 20*b* may be sized, in some embodiments to be small enough to fit through the opening 13 of the basket 12 (shown in FIG. 1) without requiring deformation or flexure of the panel while in other embodiments, the curved screen panel 20*b* may be slightly deformed, albeit temporarily, to insert through the opening 13.

The frame 42 and the screen portion 40 may be constructed as a single component or constructed by the assembly of one or more components with appropriate fastening method. The components can be fastened using suitable methods like welding, brazing, soldering, molding; design properties like magnetic properties, vacuum, friction (interference fits); devices like rivets, screws, bolts, clips, glue, hinges, chains, ropes, wires and the like. The frame 42 and the screen portion 40 may be manufactured out of same or different materials, such as suitable grades of stainless steel (For example: SAE 300, 400, austenitic steels and the like), carbon steels, suitable metals, alloys, plastics, composites, natural or synthetic materials, polymers and the like. The materials may be chosen for the specific application based on their strength, ductility/malleability, weight, rigidity/flexibility, operative temperature ranges, magnetic properties and the like. Typically, the materials and the fastening methods are chosen such that the curved screen panel 20*b* is substantially rigid to withstand loads but flexible enough to be inserted through the opening 13. The material may also be chosen such that the curved screen panel 20*b* undergoes elastic deformation both during assembly and operation without fatigue or fracture. Furthermore, based on the application, the materials may be chosen for their corrosion resistance, chemical stability or their properties can be augmented by use of coatings or sprays possessing hydrophobic, lipophpobic, oleophobic or other suitable properties. In addition seals and gaskets made of rubber and other materials can be used between two or more components for effective sealing and/or to preclude galvanic corrosion.

The screen portion 40 is formed with a plurality of openings or apertures, with the size and arrangement of the apertures suitably designed based on the application of the screen. In some embodiments the screen portion 40 is constructed out of spirally wrapped wires that form slots and serve as a filtration material. In some embodiments, the screen portion 40 may include as filtration material, a plurality of spaced filter wires, or a wire mesh supported on support rods (not shown). The screen portion 40 is constructed out of one or more screens of filtration material. In some embodiments, the screens may include “Vee-Wire” type screens. In some embodiments, the screen portion 40 may include as filtration material, plates (not shown) having perforations, slots, or other filter-type openings. In some embodiments, the spacing and sizes of wires, or other openings, vary along the length or the circumference of the screen portion 40. In some embodiments, the screen portion 40 may include as filtration material any combination of wires and plates. In some embodiments the filtration material is magnetic to filter metallic wastes.

In the “Vee-Wire” type of screen, a filtering surface is formed by wires with a V-shaped cross-section, meaning that they each have a generally triangular-shaped cross-section and which typically are parallel at constant intervals, the space between wires forming the slots of the screen. The wires can be constructed out of circular, polygonal, or any other suitable cross-section based on requirements. In some embodiments these wires are welded to filter support rods (not shown) oriented essentially perpendicularly with respect to the wires, and may be relatively thin in order to maximize the effective opening of the slots. Such a screen portion 40 may have the advantage of being very strong and being resistant to clogging. The screen portion 40 allows fluids and specifically liquids, to pass through it, while preventing particulate matter (For example: sugar crystals) greater than a predetermined size from exiting the interior volume of the basket 12. In some embodiments, each wire includes an inner surface and two lateral surfaces which may converge to a point or another surface based on the cross-section of the wires. The wires are aligned, side-by-side, with their inner surfaces lying in a plane to form a set of wires. When using wires of V-shaped cross-section, a channel is created between lateral surfaces of consecutive wires. Because of the triangular shaped cross-section of the wires in some embodiments, the channels between consecutive wires open away from the plane defined by the face surfaces of the filter wires. Put another way, the filter channels might not have parallel walls, but instead may flare from the face surfaces to the points of the wires.

Multiple sets of wires can be arranged at angle with each other in the same plane and joined to form the screen portion 40. Therefore, the one or more sets of wires creates the screen portion 40 and defines the interior volume of the assembled filter screen 14. Furthermore, the sets of wires and the filter support rods, if any are present, can be constructed out of metals, composites, plastics, coated materials, natural or synthetic materials based on the desired properties and ease of manufacture, as described previously. In some embodiments of the invention the screen may be created along a flat surface or other shaped surface, and then cut, bent or plastically deformed, to create the required contour for screen portion 40. While in other embodiments, the sets of wires may be cast or extruded in the desired contour and then fastened or welded together. Therefore, the screen portion 40 may be formed of one or more layers of wire mesh, perforated sheet metal, or any other structure, configuration, and/or material that is suitable to act as a filter for separating sugar crystals from massecuite during operation of the centrifuge 10. In this regard the mesh size of the wire mesh, or size of the perforations, openings or apertures in the screen portion may be chosen based on the size of the sugar crystals to be filtered. For instance a fine mesh may be used to filter small crystals and a relatively coarse mesh may be used to filter larger sugar crystals. The screen portion 40 may be thicker, more rigid, and more durable than traditional, collapsible filter screens of the type found in many conventional batch centrifuges. For example, the screen portion 40 may be sufficiently thick and/or rigid so as to resist significant bending or deformation under the application of manual force by a human being of average strength. In one non-limiting example, the screen portion 40 may have a thickness in a range of about ¼ inch to about ½ inch. The screen portion 40 may be thicker/thinner than the frame portion 42. The present invention with filter screen 14 comprising curved screen panels 20*a-h*, is more durable than conventional collapsible screens and therefore has to be changed less frequently, thereby reducing operating expenses. The curved screens of the present invention can be assembled and disassembled in the centrifuge 10 with minimal layover time so that regular operations of the centrifuge 10 can commence quickly. Furthermore, due to the panel construction, only the faulty screen portion can be easily removed and replaced. In addition, the low-weight construction of the filter screen 14 aids and improves the operation of the centrifuge 10, increasing the efficiency of operation. In some embodiments, the filter screen 14 can also be inserted into the basket 12, through the partial disassembly of the centrifuge in a significantly quick and efficient manner when compared with conventional methods.

As illustrated in FIG. 3, the frame 42 of the curved screen panel 20*b*, comprises a tongue feature 24, on the lateral side 42*b* and a groove feature 26 on the lateral side 42*d*. The tongue feature 24 comprises a projection/protrusion that extends at least along a portion of the length of the lateral side 42*b*. The tongue feature 24 can comprise square, quadrilateral, triangular, polygonal or curvilinear cross-sections or a combination of suitable cross sections throughout its length. The cross-section of the tongue feature 24 can comprise one or more sides. The one or more sides of the tongue feature 24 can be oriented at a suitable angle with respect to the frame portion 42. For example the sides can be perpendicular to the lateral side 42*b* as illustrated in FIG. 3 or can be oriented at acute/obtuse angles to form a dovetail joint. Furthermore, the tongue feature 24 may be placed towards the inner surface or the outer surface of the curved screen panel 20*b* or can be centered in between. In some embodiments the tongue feature 24 extends throughout the length of the lateral side 42*d* in a straight line or a suitable curve, while in other embodiments the tongue feature 24 extends only along a portion or at intermittent intervals along the length of the lateral side 42*d*. The groove feature 26 comprises a recess/depression extending along at least a portion of the length of the lateral side 42*d* to receive the tongue feature 24 of an adjacent curved panel and/or the curved screen panel 20*b*. In some embodiments the cross section and length of the groove feature is complementary to the tongue feature 24 of an adjacent curved panel. In some embodiments, the cross-sections of the tongue and groove features (24, 26) are chosen such that the tongue feature 24 can be inserted into the groove feature 26 of an adjacent curved panel in a direction perpendicular to the lateral side 42*d* or in a direction oriented at a finite angle with the lateral side 42*d*. In this regard the curved panels may be assembled by a snap joint, interference, clearance or transition fit based on the application. In other embodiments, the cross-sections of the tongue and groove features (24, 26) are chosen such that the tongue feature 24 can be slid into the groove feature 26 of an adjacent curved panel in a direction parallel to the lateral side 42*d*. In some embodiments additional components may be placed in between the tongue and groove features (24, 26) during assembly for enhanced sealing.

Now referring to FIGS. 4*a* and 4*b*, illustrating a portion of the cross-section of the curved screen panel 20*b* along the plane A-A of FIG. 3. FIGS. 4*a* and 4*b* illustrate enlarged views of alternative embodiments of the screen portion 40. In some embodiments, the screen portion includes a single screen layer. In other embodiments, the screen portion 40 is a multi-layer screen comprising at least two layers of screens. In some embodiments, the layers of screens are concentric with respect to the centrifuge axis. For example, a dual screen is illustrated in FIGS. 4*a* and 4*b* and includes a primary screen layer 40*a* positioned toward the interior of the basket 12 and a secondary screen layer 40*b* positioned toward the interior surface 16*b* of the basket 12. Other embodiments can comprise two or more primary and/or secondary screens. The primary screen layer 40*a* and/or the secondary screen layer 40*b*, in some embodiments, may be supported by or affixed to filter supports 40*c*. For example, as illustrated by FIG. 4*a*, the screen (40*a*, 40*b*) can comprise a plurality of wires, and the wires can be fastened suitably, in the desired arrangement to one or more filer supports 40*c* to form the screen. In this instance, the plurality of wires may be oriented at an angle with respect to the filter supports 40*c* to form a grid like structure with apertures of suitable sizes. In some embodiments the primary screen 40*a* can comprise a fine mesh with smaller apertures while the secondary screen 40*b* may comprise a coarse mesh with larger perforations/apertures as illustrated in FIG. 4*a*. In other embodiments the secondary screen 40*b* may comprise of backing material as illustrated by FIG. 4*b*. Furthermore, FIG. 4*b* is illustrated with a single filter support 40*c*. This multi-layer screen is beneficial because the one or more secondary screens support the primary screen, augment the structural integrity of the curved screen panel 20*b* and enable the filter screen 14 to withstand axial, tangential and torsional loads during operations of the centrifuge. This novel screen is superior to other screens (for example, screens with heavy chain mesh backing) in that the layers of screens provide adequate support without undue increase in the weight of the assembly. In some embodiments, the filter supports 40*c* also add to the structural integrity of the curved screen panel 20*b* and/or the filter screen 14.

In some embodiments, the screen layers (40*a*, 40*b*) of the multi-layer screen are chosen to provide progressive filtering of fluids in the centrifuge. The filter supports 40*c* may be one or more rods, bars, sheets or any other suitable configuration or a combination of configurations. The filter supports 40*c* may be hollow or of a solid construction. Typically, the filter supports are chosen such that they strengthen the curved screen panel 20*b* with minimum addition of weight. In some embodiments, the filter supports also comprise one or more apertures/perforations or are arranged to create apertures of a suitable size to enable fluid to pass through, thereby further reducing the weight of the assembly while in other embodiments the filter supports 40*c* are of a solid construction. Although illustrated as comprising “Vee-wires” with triangular cross-sections, the layers of screens (40*a*, 40*b*) can comprise any suitable cross-section of wires or other filter materials or designs. In some embodiments, the layers of screens are placed adjacent one another without the filter supports 40*c*. In some embodiments, the layers of screens may be fastened to each other, the frame 42 and/or the filter supports 40*c*. In some embodiments, the layers of screens (40*a*, 40*b*) are separate components that are arranged suitably during the assembly of the filter screen 14 in the centrifuge basket 12. The construction and materials used in this regard may be substantially similar to that described above for the curved screen panel 20*b*.

As described before, the curved screen panel 20*b* is substantially identical to the curved screen panels 20*a*, 20*c-h* shown in FIG. 2. In some embodiments, the curved screen panels 20*a*, 20*h* have respective shoulders 28, 30 formed in lateral sides. Referring now to FIG. 2, lateral sides of the curved screen panels 20*a-h* can be provided with complementary tongue and groove features 24, 26 such that each adjoining pair of curved panels (except for the adjoining curved screen panels 20*a*, 20*h*, described in further detail below) can be coupled together via a respective tongue and groove joint 22*a-g*. One pair of curved panels (panels 20*a*, 20*h* in the illustrated embodiment) can be provided with complementary shoulders 28, 30 in lieu of the aforementioned tongue and groove features. In use, these complementary shoulders 28, 30 may fit together to form a lap joint 22*h*. The lap joint 22*h* may be securely fastened by one or more removable mechanical fasteners 32 (For example: set screws, bolts and the like) that may extend through the shoulders 28, 30 to fix the curved screen panels 20*a*, and 20*h* together. The complementary shoulder 28 comprises a projection/protrusion on the frame portion 42 of the curved screen panel 20*h* (typically closer to either the inner surface or the outer surface of the curved screen panel 20*h*) and an adjacent recess to receive a projection/protrusion of the curved screen panel 20*a*. Similarly, the complementary shoulder 30 comprises the projection/protrusion and an adjacent recess to receive the projection of the curved screen panel 20*h*.

The opposing lateral sides (42*b*, 42*d*) of the frame 42 may be formed with the tongue and groove features 24, 26 described above (and the adjoining frame edges of the curved screen panels 20*a*, 20*h* may be formed with the shoulders 28, 30 described above). Thus, the tongue 24 and groove 26 features (or the shoulders 28, 30) may be machined into the opposite lateral sides of the frame portion 42 as described above, can be additional components affixed to the frame portion 24 or can be cast integral with the frame portion 42. In the illustrated embodiment, the curved panel includes a tongue feature 24 on one lateral side and a groove feature 26 on the opposite lateral side. Thus arranged, when the panels 20*a-g* are joined together as shown in FIG. 2, joints 22*a-h* formed by the interlocking tongue and groove features 24, 26 and shoulders 28,30 may be sufficiently tight so as to prevent sugar crystals from passing therethrough during operation of the centrifuge 10.

To install the filter screen 14 in the basket 12, each of the rigid curved screen panels 20*a-h* may be lowered into the basket 12 through the opening 13 and joined together in a sequential manner. For example, the curved screen panel 20*a* may first be lowered into the basket 12 through the opening 13, after which the curved screen panel 20*b* may be lowered into the basket 12 and the tongue feature 24 on the frame edge of the curved screen panel 20*b* may be fit into the groove feature 26 in the frame edge of the curved screen panel 20*a*. The remaining curved screen panels 20*c-g* may be installed in a similar manner, one after another. The curved screen panel 20*h* may be installed last, with the tongue feature 24 on the frame edge of the curved screen panel 20*b* being fit into the groove feature 26 of the curved screen panel 20*h*, and then pivoting the curved screen panel 20*h* so that the shoulder 28 in frame edge of the curved screen panel 20*h* is moved into engagement with the shoulder 30 in the frame edge of the curved screen panel 20*a* to form the lap joint 22*h*. One or more mechanical fasteners 32 may then be used to secure the lap joint 22*h* as described above. Since the curved screen panels 20*a-h* are rigid and must be assembled within a confined space (i.e., in the basket 12), the lap joint 22*h* allows the curved screen panels 20*a-h* to be joined together to form the assembled filter screen 14 without requiring any of the curved screen panels 20*a-h* to be bent or deformed during installation. This innovative solution to assemble the screens is further advantageous since the disclosed curved screen panels 20*a-h* enable the assembly of the filter screen securely in the confined space of basket 12, even when the opening 13 is the only provision for access. In some embodiments the tongue and groove features (24, 26) and the complementary shoulders (28, 30) may be configured to have a slight relative motion during and/or after assembly to aid the interlocking and disassembly of the curved screen panels 20*a-h*. The curved screen panels 20*a-h* of the present invention also have the advantage of providing enhanced sealing for the centrifuge. In this regard the tongue and groove features (24, 26) and the complementary shoulders (28, 30), have at least a partial overlap when assembled in some embodiments, thereby providing tight seals while maintaining the structural integrity of the filter screen 14.

In some embodiments, the assembly of the filter screen 14 in the interior of the basket 12 is succeeded by operations of the centrifuge, for example sugar filtration operations. In this regard the method for separating sugar crystals from massecuite may comprise: placing an amount of massecuite containing sugar crystals in the basket 12 of the batch centrifuge 10; accelerating the basket 12 of the batch centrifuge 10 to spin for a predetermined spin time and at a suitable velocity; forcing the massecuite out of the interior of the basket 12 of the batch centrifuge 10 through the filter screen 14 and the apertures 18 of the basket 12; and removing sugar crystals from the filter screen 14 (for example by using a scraper arm of the centrifuge 10). In some embodiments, in order to remove the filter screen 14 from the basket 12, such as during replacement of the filter screen 14 and/or after the centrifuge operations, the above-described assembly process may be performed in reverse. In the embodiments with sub-panels, the tongue and groove features may also be present on the proximal and/or distal sides of the sub-panel (not shown) in addition to the lateral sides. One or more sub-panels can be assembled to form the curved screen panels and/or the filter screen 14 in a substantially similar manner to the method described above.

Referring to FIG. 5, it is contemplated that, in the second embodiment of the invention, instead of the tongue and groove features 24, 26 and shoulders 28, 30 described above, the opposing longitudinal edges of the frame portion 42 of the curved screen panels 20*a-g* may alternatively be formed with a plurality of longitudinally-spaced, complementary hook and loop features 124, 126. As depicted in FIG. 6, which illustrates a section of the top view of the assembled filter screen 14, the curved screen panel 20*b* comprises a hook feature 124 on the on the lateral side 42*b* of the frame portion 42 and a loop feature 126 on the opposite lateral side 42*d* of the frame portion 42 (only one hook feature 124 and one loop feature 126 are visible in the edge view shown in FIG. 6). The hook and loop features (124, 126) may be formed integrally with the frame portion 42, may be machined on the frame portion 42 or may be separate components that are fixedly fastened to the frame portion 42. The curved screen panels 20*a* and 20*c-h* may also comprise similar hook 124 and loop 126 features. Thus arranged, when the panels 20*a-h* are joined together as exemplified by the panels 20*a*, 20*b* shown in FIG. 7*b*, joints such as joint 22*a* formed at the junctures of the interlocked panels 20*a-h* may be sufficiently tight so as to prevent sugar crystals from passing therethrough during operation of the centrifuge 10. As illustrated in FIG. 6, the hook feature 124 of the curved screen panel 20*b* may mate with a complementary loop feature 126 of the curved screen panel 20*c* and the loop feature 126 of the curved screen panel 20*b* may mate with a complementary loop feature 126 of the curved screen panel 20*a*. As best illustrated in FIG. 7*a*, illustrating a section the front view of the filter screen 14, one or more hook and loop features (124, 126) may be present along the length of the lateral sides (42*b*, 42*d*). In this regard the spacing between adjacent hook and loop features (124, 126) may be constant or may vary along the length of the lateral sides.

Now referring to FIG. 7*b*-7*d*, illustrating an enlarged views of the hook and loop feature (124, 126). The hook feature 124, further comprises a projection/protrusion 124*b* from the lateral side of the frame portion 42. The projection 124*b* is illustrated as positioned towards the inner surface of the curved screen panel 20*b*, however, the projection 124*b* can be positioned toward the outer surface of the curved screen panel 20*b* or can be placed centrally. The hook feature

124 further comprises a hook/clasp 124*a* positioned on the projection 124*b*, either towards the outer surface or the inner surface of the curved screen panel 20*b*. The hook 124*a* comprises one or more sides, of straight or curvilinear shape. In some embodiments, the hook 124*a* may be a cross section, in a plane perpendicular to the lateral side of the frame portion 42, whose perimeter has at least one opening between the hook 124*a* and the projection 124*b* (typically, toward the lateral side 42*b*), for example an inverted "L", "U", "C" or any other suitable cross-section. For instance, as best illustrated in FIGS. 7*c* and 7*d*, the hook 124*a* may comprise a first side and a second side, oriented at an angle with respect to each other forming a substantially "L" cross-section. One end of the first side may be fixed to the projection 124*b* such that there is an opening between the second side and the projection 124*a*.

The loop feature 126 further comprises a recess/depression 126*b* on the lateral side of the frame portion 42, complementary to and capable of receiving the projection 124*b* of an adjacent curved screen panel. In this regard, a small clearance may be provided between the projection 124*b* and the recess 126*b*, such that the hook feature 124 and the loop feature 126 may move relative to each other after assembly. Typically, the relative movement between the hook feature 124 and the loop feature 126 is configured such that, one assembled, at least a portion of the projection 124*b* is in contact with (or overlapping) at least a portion of the recess 126*b*, thereby maintaining effective sealing. The loop feature 126 further comprises a loop/ring 126*a* fixed to the portion of the lateral side of the frame portion 42, adjacent to the recess 126*b*. The loop 126*a* comprises one or more bars, of straight or curvilinear shape. In some embodiments, the loop 126*a* may be a cross section, in a plane parallel to the lateral side of the frame portion 42, such that the one or more bars of the loop 126*a* and/or the lateral side of the frame portion 42 surround a central opening. For instance, as best illustrated in FIGS. 8*a* and 8*b*, the loop 126*a* may comprise a first bar, a second bar fixed to the first bar and a third bar fixed to the second bar at a suitable angle forming a substantially "U" cross-section. The ends of the first and third bars not connected to the second bar may be fixed to the lateral side of the frame portion 42 such that there is an opening between the three bars and the frame portion 42.

For assembly, the hook 124*a* is placed below the loop 126*a*. The hook 124*a* is then drawn through the opening in the loop 126*a*, while the loop 126*a* is maneuvered through the opening in the hook 124*a* causing the projection 124*b* to be received in the recess 126*b*. This causes the hook and loop features (124, 126) to be interlocked, quickly and easily as best illustrated in FIGS. 8*a* and 8*b*. The hook and loop features (124, 126) can be disassembled by performing the assembly steps in a reverse order. In some embodiments, the hook feature 124 and loop feature 126 are slightly flexible such that the hook 124*a* and the loop 126*a* can be snapped into place. Notably, the interlocked hook 124 and loop 126 features may hold all of the panels 20*a-h* together in the assembled configuration shown in FIG. 5 without requiring any additional mechanical fasteners such as screws. Moreover, since the hooks 124 are able to move laterally a short distance within their respective loops 126 (i.e., since the loops 126 may be larger than the hooks 124), the adjoining panels 20*a-h* may slide laterally a short distance relative to one another facilitating the assembly and disassembly of the hook and loop features (124, 126) and hence the filter screen 14.

To install the alternative filter screen 14 shown in FIG. 5 in the basket 12 (shown in FIG. 1), each of the rigid curved screen panels 20*a-h* may be lowered into the basket 12 through the opening 13 and joined together in a sequential manner. For example, the curved screen panel 20*a* may first be lowered into the basket 12 through the opening 13, after which the curved screen panel 20*b* may be lowered into the basket 12 and the loop feature 126 on the frame edge of the curved screen panel 20*b* may be fit over the hook feature 124 on the frame edge of the curved screen panel 20*a*. The remaining curved screen panels 20*c-h* may be installed in a similar manner, one after another. Since the curved screen panels 20*a-h* may be rigid and must be assembled within a confined space (i.e., in the basket 12), the complementary hook and loop features 124, 126 allow the curved screen panels 20*a-h* to be joined together to form the assembled filter screen 14 without requiring any of the curved screen panels 20*a-h* to be bent or deformed during installation. In order to remove the filter screen 14 from the basket 12, such as during replacement of the filter screen 14, the above-described process may be performed in reverse.

Referring to FIG. 9, it is contemplated that, instead of the tongue and groove features 24, 26 or the hook and loop features 124, 126 described above, the opposing lateral sides of the frames 42 of the curved screen panels 20*a-h* may alternatively be formed with complementary shoulders 128, 130 that are similar to the shoulders 28, 30 described above. For example, the shoulders 128, 130 may be machined into the solid metal bar elements positioned on opposite lateral sides of the curved screen panels 20*a-h*. In the illustrated embodiment, each of the curved screen panels 20*a-h* includes an outwardly-directed shoulder 128 formed on one lateral side thereof and an inwardly-directed shoulder 130 formed on an opposite lateral side thereof. Thus arranged, when the panels 20*a-h* are joined together as shown in FIG. 9, lap joints 22*a-h* formed at the junctures of the adjoining panels 20*a-h* may be sufficiently tight so as to prevent sugar crystals from passing therethrough during operation of the centrifuge 10. In order to hold the curved screen panels 20*a-h* in further firm engagement with one another in any of the embodiments described above, a ring clamp 127 be disposed within the assembled filter screen 14 and may be adjustably expanded to exert a radially-outwardly directed force on the curved screen panels 20*a-h*. In some embodiments, the ring clamp 127 may comprise a band 127*a* with at least one opening, projections 127*b* on either side of each opening and a fastener 127*c*. The projections 127*b* may comprise one or more threaded bores to receive the fastener 127*c* (typically, a threaded fastener). The opening enables the band to elastically deform or twist or wrap the band 127 around itself or the ends of the band 127 to overlap. This enables the band to be lowered into the basket 12 through opening 13, with reduced dimensions (diameter of band 127*b*) and then expanded inside the basket 12. The band can then be secured at the desired diameter and/tension using the projections 127*b* and the fastener 127*c*. Although disclosed as projections 127*b* and fastener 127*c*, any suitable means of releasably fastening the ends of the band 127*a* at the one or more openings can be employed. The ring clamp 127 may be installed near a top end of the filter screen, and a substantially identical, second ring clamp (not shown) may be similarly installed near a bottom end of the filter screen 14. The curved screen panels 20*a-h* may thereby be securely held in the arrangement shown in FIG. 9 with tight seals maintained therebetween. Moreover, since the shoulders 128, 130 of the curved screen panels 20*a-h* are not rigidly fastened to one another, the adjoining panels 20*a-h* may slide laterally a short distance relative to one another while maintaining tight seals at the overlapping joints 22*a-h* therebetween as described here and elsewhere in this disclosure.

To install the alternative filter screen 14 shown in FIG. 9 in the basket 12 (shown in FIG. 1), each of the rigid curved screen panels 20*a-h* may be lowered into the basket 12 through the opening 13 and joined together in a sequential manner. For example, the curved screen panel 20*a* may first be lowered into the basket 12 through the opening 13, after which the curved screen panel 20*b* may be lowered into the basket 12 and the shoulder feature 128 on the frame edge of the curved screen panel 20*b* may be laid on top of the shoulder feature 130 on the frame edge of the curved panel to form a lap joint. The remaining curved screen panels 20*c-h* may be installed in a similar manner, one after another. Since the curved screen panels 20*a-h* are rigid and must be assembled within a confined space (i.e., in the basket 12), the complementary shoulders 128, 130 allow the curved screen panels 20*a-h* to be joined together to form the assembled filter screen 14 without requiring any of the curved screen panels 20*a-h* to be bent or deformed during installation. The ring clamp 127 (and the additional lower ring clamp that is not shown) may then be inserted into the assembled filter screen 14 and installed as described above. In order to remove the filter screen 14 from the basket 12, such as during replacement of the filter screen 14, the above-described process may be performed in reverse.

In view of the foregoing description, it will be appreciated that the present disclosure provides a filter screen 14 that can be expeditiously removed and replaced and that is more rigid and more durable than thin filter screens that are typically employed in current practice. The filter 14 may therefore have a longer useful life and may require less frequent replacement than conventional filter screens. Moreover, the filter screen 14 may be implemented without a heavy mesh backing (i.e., perforated plate) as is often employed with conventional filter screens, thereby allowing the filter screen 14 to be positioned immediately adjacent the interior surface 16*b* of the basket 12.

While the above-described filter screen 14 includes a total of eight curved screen panels 20*a-h*, alternative embodiments of the filter screen 14 are contemplated that employ a greater or fewer number of curved panels as long as each panel is able to fit though the opening 13 of the basket 12 as described above. It is further contemplated that a centrifuge 10 may be provided with filter supports (not shown) interposed between the filter screen 14 and the interior surface of the basket 12, such as for providing the filter screen 14 with additional support. This may be desirable where relatively thinner filter portions 40 are employed such that additional support is desirable. Additionally, while the frame edges of the curved screen panels 20*a-h* of the exemplary filter screen 14 are shown as being provided with tongue and groove features 24, 26, shoulders 28, 30, hook and loop features 124, 126, and shoulders 128, 130 for forming various types of joints, it is contemplated that the frame edges could be provided with a variety of additional or alternative features or configurations for facilitating interconnection of the curved screen panels 20*a-h* in a similar manner.

Further, although the previously described embodiments disclose a final section joint comprising a lap joint secured with set screws, it is contemplated that this final joint may instead be made without fasteners or other hardware. For example, the lap joint could be replaced by a joint in which opposing panel edges are fit together with the joint indented inward. The panel edges can then be pushed out until the edges and the panels pop into place against the basket sidewall 16 or a perforated cylinder disposed between the panels and the basket sidewall.

Although the filter screen disclosed herein is described with respect to sugar processing, a filter screen in accordance with the present invention may also be used in chemical and resin industries and other batch filtration operations.

While the present invention has been disclosed with reference to certain embodiments, numerous modifications, alterations and changes to the described embodiments and other new embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the sphere and scope of the appended claims. Although specific terms are employed herein, they are used in a generic and descriptive sense only and not for purposes of limitation. Accordingly, it is intended that the present invention not be limited to the described embodiments, but that it has the full scope defined by the language of the following claims, and equivalents thereof. In addition, where possible, any terms expressed in the singular form herein are meant to also include the plural form and/or vice versa. As used herein, "at least one" shall mean "one or more" and these phrases are intended to be interchangeable. Accordingly, the terms "a" and/or "an" shall mean "at least one" or "one or more," even though the phrase "one or more" or "at least one" is also used herein. Furthermore, references to "one embodiment" of the present invention are not intended to be interpreted as excluding the existence of additional embodiments that also incorporate the recited features.

What is claimed is:

1. A batch centrifuge filter screen comprising:

a plurality of filter panels, wherein each of the plurality of filter panels comprises a screen portion and a frame;

wherein each of the plurality of filter panels further comprises one or more detachable coupling features disposed along lateral sides of each filter panel to enable the plurality of filter panels to be sequentially coupled together to form the batch centrifuge filter screen, wherein the one or more coupling features of at least two of the plurality of filter panels includes complimentary shoulders for forming a lap joint when the at least two of the plurality of filter panels are coupled together along adjacent lateral sides; and wherein a fastener is utilized to maintain the lap joint such that the plurality of filter panels remain coupled together, the fastener is operably coupled to one or more expandable ring clamps configured to secure the plurality of filter panels inside a basket of the batch centrifuge by exerting radially-outwardly directed force on the plurality of filter panels.

2. The batch centrifuge filter screen according to claim 1, wherein the fastener is disposed through the complementary shoulders to fix the at least two of the plurality of filter panels together.

3. The batch centrifuge filter screen according to claim 1, wherein the complementary shoulder enable the resulting lap joint to be indented inward, and then pushed outward until the at least two of the plurality of filter panels pop into place against a surface on an the of a basket of a batch centrifuge.

4. The batch centrifuge filter screen according to claim 1, wherein the one or more coupling features form at least partially overlapping lap joints when at least two of the plurality of filter panels are coupled together along adjacent lateral sides, wherein the partially overlapping lap joints are configured to provide a tight seal for the filter screen.

5. The batch centrifuge filter screen according to claim 1, wherein each of the plurality of filter panels has a thickness in a range of ¼ inch to ½ inch.

6. The batch centrifuge filter screen according to claim 1, wherein the screen portion of each of the plurality of filter panels includes a plurality of openings, wherein each opening is sized and configured to retain sugar crystals from massecuite that is added into a batch centrifuge.

7. The batch centrifuge filter screen according to claim 1, wherein the screen portion comprises at least two screen layers, at least one of the screen layers comprising a plurality of wires, wherein the plurality of wires comprise a triangular cross-section.

8. A batch centrifuge for separating sugar crystals from massecuite, wherein the batch centrifuge comprises:

at least one basket, wherein the basket comprises a first end and an opposite second end and a basket surface between the first end and the second end, wherein the first end and the second end define a centrifuge axis, wherein the first end comprises at least one opening, wherein the basket surface comprises a plurality of apertures;

at least one shaft, wherein the at least one shaft is oriented along the centrifuge axis; and the batch centrifuge filter screen according to claim 1, wherein each of the plurality of filter panels are configured to be sequentially inserted through the at least one opening and the batch centrifuge filter screen assembled inside the at least one basket.

9. The batch centrifuge filter screen of claim 1, wherein the complimentary shoulders forming the lap joint can slide laterally a short distance such that the two of the at least plurality of filter panels can move laterally relative to each other while maintaining a tight seal at the lap joint and at coupling locations between the remaining plurality of filter panels.

10. The batch centrifuge filter screen according to claim 1, wherein each of the one or more ring clamps includes a band defining an opening and pair of projections with each projection being located on an opposed side of the opening, whereby the fastener connects across the opening and between the projections to secure the ring clamp.

* * * * *